US007851559B2

(12) United States Patent
Lee

(10) Patent No.: US 7,851,559 B2
(45) Date of Patent: Dec. 14, 2010

(54) SOFT ZERO HALOGEN FLAME RETARDANT THERMOPLASTIC ELASTOMERS

(75) Inventor: Biing-Lin Lee, Cranston, RI (US)

(73) Assignee: Teknor Apex Company, Pawtucket, RI (US)

( * ) Notice: Subject to any disclaimer, the term of this patent is extended or adjusted under 35 U.S.C. 154(b) by 82 days.

(21) Appl. No.: 11/983,986

(22) Filed: Nov. 13, 2007

(65) Prior Publication Data
US 2009/0124743 A1   May 14, 2009

(51) Int. Cl.
C08L 53/02 (2006.01)
C08K 3/32 (2006.01)

(52) U.S. Cl. ............... 525/333.3; 525/98; 525/97; 525/99; 525/330.3; 524/414

(58) Field of Classification Search ............... 525/333.3, 525/98, 99, 97, 330.3; 524/414
See application file for complete search history.

(56) References Cited

U.S. PATENT DOCUMENTS

| | | | |
|---|---|---|---|
| 4,639,331 A | 1/1987 | Elsner et al. | |
| 5,282,998 A | 2/1994 | Horn et al. | |
| 5,629,400 A | 5/1997 | Standke et al. | |
| 5,679,147 A | 10/1997 | Standke et al. | |
| 5,750,600 A | 5/1998 | Nozokido et al. | |
| 5,885,341 A | 3/1999 | Standke et al. | |
| 5,932,757 A | 8/1999 | Standke et al. | |
| 6,262,161 B1 | 7/2001 | Betso et al. | |
| 6,291,068 B1 | 9/2001 | Wang et al. | |
| 6,444,315 B1 | 9/2002 | Barfurth et al. | |
| 6,756,440 B2 | 6/2004 | Hase et al. | |
| 7,074,855 B2 | 7/2006 | Nakamura et al. | |
| 7,196,137 B2 * | 3/2007 | McBride et al. | ............ 525/97 |
| 7,371,805 B2 * | 5/2008 | Sasagawa et al. | ............ 526/346 |
| 2005/0070645 A1 * | 3/2005 | Williams et al. | ............ 524/132 |
| 2006/0084740 A1 | 4/2006 | Kao et al. | |
| 2006/0192186 A1 * | 8/2006 | Matsumura et al. | ......... 252/601 |
| 2007/0219317 A1 * | 9/2007 | Uchikawa | ............ 525/88 |
| 2009/0048382 A1 * | 2/2009 | Lee et al. | ............ 524/445 |

FOREIGN PATENT DOCUMENTS

| | | |
|---|---|---|
| EP | 0 180 790 | 5/1986 |
| EP | 0 675 128 | 10/1995 |
| JP | 03-131508 | 6/1991 |
| JP | 2003-277573 | 10/2003 |
| WO | WO 2004003027 A1 * | 1/2004 |
| WO | WO 2004/044049 | 5/2004 |

* cited by examiner

Primary Examiner—Satya B Sastri
(74) Attorney, Agent, or Firm—Hudak, Shunk & Farine Co. LPA

(57) ABSTRACT

Soft flame retardant thermoplastic compositions that are preferably halogen free and include a styrenic block copolymer having a low modulus, one or more of a polyolefin polymer or copolymer and an acrylate containing polymer or copolymer, one or more of a softener and plasticizer, an inorganic phosphorous-containing flame retardant, and optionally but preferably, a platelet filler such as a nanoclay or an organic modified clay. In a preferred embodiment, the phosphorous-containing flame retardant has a surface coating thereon which reduces sensitivity of the flame retardant to water, and thus reduces the amount of the flame retardant that can leach out in the presence of water, thereby enabling the compositions of the present invention to be utilized outdoors or other environments where exposure to water or high humidity is possible. The hardness of the compositions according to the invention preferably ranges from about Shore A 40 to about Shore A 90. The compositions exhibit high char formation upon burning and also desirable vertical burn characteristics.

38 Claims, No Drawings

SOFT ZERO HALOGEN FLAME RETARDANT THERMOPLASTIC ELASTOMERS

FIELD OF THE INVENTION

The present invention relates to soft flame retardant thermoplastic elastomer compositions that are preferably halogen free and include a styrenic block copolymer having a low modulus, one or more of a polyolefin polymer or copolymer and an acrylate containing polymer or copolymer, one or more of a softener and plasticizer, an inorganic phosphorous-containing flame retardant, and optionally but preferably, a platelet filler such as a nanoclay or an organic modified clay. In a preferred embodiment, the phosphorous-containing flame retardant has a surface coating thereon which reduces sensitivity of the flame retardant to water, and thus reduces the amount of the flame retardant that can leach out of the compositions in the presence of water, thereby enabling the compositions of the present invention to be utilized outdoors or in other environments where exposure to water or high humidity is possible. The hardness of the compositions according to the invention preferably ranges from about Shore A 40 to about Shore A 90. The compositions exhibit high char formation upon burning and also desirable vertical burn characteristics.

BACKGROUND OF THE INVENTION

Flame retardation of polymers is currently mandatory for many of their applications in various countries according to certain laws and regulations. Of particular importance are the requirements of polymeric devices, utilized in electrical, electronic and communication systems. In view of the necessity of flame retardancy, a number of systems for flame retardant polymers have been developed. Flame retarding systems usually involve mixing or blending of a polymer with one or more flame retarding chemical additives. Flame retardant compounds based on halogen-containing compounds have been utilized. They are in many cases applied in conjunction with co-additives or synergists such as antimony trioxide. Halogen-based additives can provide reasonable protection from fire hazards. However, some halogen containing compositions suffer from inadequacies and can generate, upon combustion, corrosive hydrogen halides. They also are generally used in relatively high concentration in order to impart flame retardancy.

Metal hydroxides have also been utilized as flame retardants. However, compositions generally require large amounts of the metal hydroxides to be effective for imparting flame retardancy. Metal hydroxides are generally not suitable for developing soft flame retardant thermoplastic elastomer compositions as they can increase specific gravity and can undesirably increase hardness of compositions.

A further method of incorporating flame retardancy into various polymers is to provide a composition with intumescent compounds. According to the principle of intumescence, flame retardant additives form, during the first stages of pyrolysis and combustion, a foamed porous barrier which is substantially impermeable to combustible gasses evolved during pyrolysis and to the molten polymer, prevents their flow to the flaming surface. In addition, it is believed that the intumescent barrier hinders convection of the heat generated in the combustion from entering into the plastic. Additives utilized in intumescent systems can, comprise a "catalyst", such as ammonium polyphosphate, a char-forming agent, in most cases a polyhydric alcohol, such as pentaerythritol, and a blowing agent using a nitrogeneous material, such as melamine, guanidine or urea, which produce non-combustible gases.

U.S. Pat. No. 5,750,600 relates to a reportedly nonflammable olefin thermoplastic elastomer composition (F) for use in skins of interior automotive trim, which comprises an oil-extended olefin thermoplastic elastomer composition (G), melamine-coated ammonium polyphosphate (h), a specified 1,3,5-triazine derivative, and a lubricant (f), wherein the composition (G) comprises an olefin thermoplastic elastomer composition (D) and a mineral oil (e), the composition (D) comprising 50 to 70% by weight of an ethylene/α-olefin copolymer elastomer (A) having a Mooney viscosity (ML1+4(100° C.)) of 40 to 100, 35 to 21% by weight of a polypropylene resin (B) having a crystal melting point of 140° to 165° C. and an ethylene unit content of 1 to 2% by weight and 15 to 9% by weight of a low-density polyethylene resin (C) having a density of 0.90 to 0.93 $g/cm^3$ and a crystal melting point of 102°-118° C.

U.S. Pat. No. 6,262,161 relates to compositions reportedly having enhanced ignition resistance, comprising from about 5 to about 90 percent by weight of at least one substantially random interpolymers; from about 10 to about 94.9 percent by weight of at least one filler selected from ammonium polyphosphate, magnesium hydroxide, calcium hydroxide, and aluminum trihydrate; and at least one component selected from about 5 to about 50 percent by weight of at least one filler; or about 0.5 to about 20 percent by weight of at least one metal borate, and, optionally, about 0.5 to about 10 percent by weight of at least one processing aid; or about 0.1 to about 15 percent by weight of at least one initiator or at least one coupling agent; or about 0.1 to about 20 percent by weight of at least one hindered amine stabilizer.

U.S. Pat. No. 6,756,440 relates to a reportedly fire resistant resin composition, a method of making the resin composition and an electrical wire comprising the composition. The composition includes a halogen-free propylene resin containing propylene as its main monomer component, a halogen-free styrene-based thermoplastic elastomeric resin modified with an unsaturated carboxylic acid or a derivative of such an acid, and a fire resistant metal hydroxide.

U.S. Publication No. 2006/0084740 relates to a reportedly low-smoke, halogen-free and flame-retardant thermoplastic elastomer. The thermoplastic elastomer includes a polymer having a hydrogenated styrenic/conjugated diene copolymer, an inorganic phosphorus flame-retardant and a flame retardant auxiliary, wherein a weight of the hydrogenated styrenic/conjugated diene copolymer is 50-100 percents of a weight of the polymer, a weight of the inorganic phosphorus flame-retardant is ranged from 0.3 to 2 times of the weight of the hydrogenated styrenic/conjugated diene copolymer, and a weight of the flame-retardant auxiliary is ranged from 0.05 to 0.4 times of the weight of the hydrogenated styrenic/conjugated diene copolymer.

Japanese Publication No. 2003-277573 relates to a non-halogen polymer composition which reportedly has sufficiently high flame retardancy and flexibility, reportedly inhibits blooming of additives to prevent attachment of dust, etc., reportedly has an improved windability by cord reels and is reportedly suitable as a sheathing for a power cord.

International Publication No. WO 2004/044049 relates to reportedly flame retardant plastic resin blends comprising an intumescent flame retardant and at least one plastic resin. Engineering resin blends comprise an intumescent flame retardant and at least one engineering resin. Thermoset resin blends comprise an intumescent flame retardant and at least one thermoset resin. The plastic resin blends and the engineering resin blends are non-halogen. The thermoset resin blends are substantially non-halogen.

SUMMARY OF THE INVENTION

It is an object of the present invention to provide flame retardant compositions, preferably free of halogens, which exhibit desirable vertical burn characteristics.

A further object of the present invention is to provide thermoplastic elastomer compositions that exhibit high char formation upon burning.

Yet another object of the present invention is to provide substantially halogen-free flame retardant soft polymeric compositions that pass the UL 94 V-0 burn test, and thus form substantially charred compositions when burned.

Another object of the present invention is to provide thermoplastic elastomer compositions that can be injection molded for making electronic parts, and can be utilized as jacketing compounds for wire and cable by extrusion.

Still another object of the present invention is to provide thermoplastic elastomer compositions that are suitable for use outdoors or other environment where exposure to water or high humidity is possible. In a preferred embodiment, the inorganic phosphorus-containing flame retardant and optionally other compounds, such as a polyalcohol, e.g. pentaerythritol, include a surface coating which minimizes the sensitivity of the inorganic phosphorus-containing flame to water via encapsulation. The surface coating is believed to prevent the components from leaching out of the composition when subjected to water.

In one aspect of the invention, a soft, flame retardant elastomer thermoplastic elastomer composition is disclosed, comprising a styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block includes at least one repeat unit derived from an olefin or a diene; one or more of a polyolefin polymer or copolymer and a polyacrylate polymer or copolymer, wherein when the polyolefin polymer or copolymer is present, the amount ranges from about 3 to about 60 parts based on 100 parts by weight of the styrenic block copolymer, and wherein when the polyacrylate polymer or copolymer is present, the amount ranges from about 1 to about 100 parts based on 100 parts by weight of the styrenic block copolymer; a softener in an amount from about 5 to about 100 parts, based on 100 parts by weight of the styrenic block copolymer; and a surface coated composition comprising a surface coating agent encapsulating an inorganic phosphorus-containing flame retardant in an amount from about 5 to about 70 parts per 100 total parts by weight of the styrenic block copolymer, polyolefin polymer or copolymer, polyacrylate polymer or copolymer, and softener, and wherein the thermoplastic elastomer composition has a Shore A hardness of about 40 to about 90.

In another aspect of the invention, a soft, flame retardant thermoplastic elastomer composition is disclosed, comprising a styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block includes at least one repeat unit derived from an olefin or a diene; one or more of a polyolefin polymer or copolymer and a polyacrylate polymer or copolymer, wherein when the polyolefin polymer or copolymer is present, the amount ranges from about 3 to about 60 parts based on 100 parts by weight of the styrenic block copolymer, and wherein when the polyacrylate polymer or copolymer is present, the amount ranges from about 1 to about 100 parts based on 100 parts by weight of the styrenic block copolymer; a softener in an amount from about 5 to about 100 parts, based on 100 parts by weight of the styrenic block copolymer; an inorganic phosphorus-containing flame retardant in an amount from about 5 to about 70 parts based on 100 parts by weight of the styrenic block copolymer, polyolefin polymer or copolymer, polyacrylate polymer or copolymer and softener; and an organically modified clay in an amount from about 0.5 to about 30 parts per 100 parts by weight of the styrenic block copolymer, and wherein the composition has a Shore A hardness of about 40 to about 90.

In yet another aspect of the invention, a soft, flame retardant thermoplastic elastomer composition is disclosed, comprising a styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block includes at least one repeat unit derived from an olefin or a diene; a second styrenic block copolymer having a modulus greater than 7.0 E+6 Pa, wherein the second styrenic block copolymer has at least one hard polymer block derived from at least two aromatic vinyl compound units, and has at least one soft polymer block, wherein the soft polymer block includes at least one repeat unit derived from an olefin or a diene; one or more of a polyolefin polymer or copolymer and a polyacrylate polymer or copolymer, wherein when the polyolefin polymer or copolymer is present, the amount ranges from about 3 to about 60 parts based on 100 parts by weight of the styrenic block copolymer, and wherein when the polyacrylate polymer or copolymer is present, the amount ranges from about 1 to about 100 parts based on 100 parts by weight of the styrenic block copolymer; a softener in an amount from about 5 to about 100 parts, based on 100 parts by weight of the styrenic block copolymer; and an inorganic phosphorus-containing flame retardant in an amount from about 50 to about 70 parts based on 100 parts by weight of the styrenic block copolymer.

DETAILED DESCRIPTION OF THE INVENTION

Compositions of the present invention are substantially halogen free, flame retardant thermoplastic elastomers. The compositions exhibit desirable flame retardant qualities such as high char formation and desirable vertical burn rates upon burning. The compositions can be processed for example, using injection molding, extrusion, compression molding, or injection overmolding, or the like. Compositions include one or more styrenic block copolymers; one or more of a polyolefin polymer, a polyolefin copolymer and an acrylate containing polymer and/or copolymer; at least one inorganic phosphorus-containing flame retardant; one or more of a softener and plasticizer; and optionally, but preferably, one or more of zinc borate, aluminum tri-hydroxide, and one or more platelet fillers, such as a nanoclay and/or an organically modified clay. In a preferred embodiment, the inorganic phosphorus-containing flame retardant is present with additional synergistic components as an intumescent mixture which contains compounds required for intumescence. Optionally, but preferably, at least the inorganic phosphorus-containing flame retardant is encapsulated within a coating that aids in reducing the amount of leaching of the inorganic phosphorus-containing flame retardant that can occur when compositions of the present invention are exposed to water or high humidity.

Styrenic Block Copolymer

The compositions of the present invention include a styrenic block copolymer having a hard block (A) including aromatic vinyl repeat units and at least one soft polymer block (B) including two or more repeat units, that are the same or different, independently derived from one or more of an olefin monomer and a diene monomer. The styrenic block copolymer is preferably hydrogenated. The styrenic block copolymer can be, for example, a diblock copolymer (A-B) having a hard polymer block (A) and a soft block (B); a triblock copolymer (A-B-A or B-A-B); or a tetrablock or higher multiblock copolymer. In a preferred embodiment, the styrenic block copolymer is a triblock copolymer (A-B-A) having two hard blocks.

Each hard polymer block (A) can have two or more same or different aromatic vinyl repeat units. For example, the block copolymer may contain (A) blocks which are styrene/alpha-methylstyrene copolymer blocks or styrene/butadiene random or tapered copolymer blocks so long as a majority of the repeat units of each hard block are aromatic vinyl repeat units. The (A) blocks are preferably aromatic vinyl compound homopolymer blocks. The term "aromatic vinyl" is to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred aromatic vinyl compounds are monovinyl monocyclic aromatics, such as styrene and alpha-methylstyrene, with styrene being most preferred. When three or more different repeat units are present in hard polymer block (A), the units can be combined in any form, such as random form, block form and tapered form.

Optionally, the hard polymer block (A) can comprise small amounts of structural units derived from other copolymerizable monomers in addition to the structural units derived from the aromatic vinyl compounds. The proportion of the structural units derived from other copolymerizable monomers is desirably 30% by weight or less and preferably 10% by weight or less based on the total weight of the hard polymer (A). Examples of other copolymerizable monomers include, but are not limited to, methacrylic ester, acrylic ester, 1-butene, pentene, hexene, conjugated dienes such as butadiene or isoprene, methyl vinyl ether, and other monomers.

The soft polymer block (B) of the styrenic block copolymer comprises one or more and preferably two or more, same or different, structural units. Soft polymer block (B) can be derived from monomer units from one or more of a conjugated diene monomer and an olefin monomer. The olefin monomers generally have from 2 to about 12 carbon atoms and include, for example, ethylene, propylene, butylene, etc. The conjugated diene monomers preferably contain from 4 to about 8 carbon atoms with examples including, but not limited to, 1,3-butadiene (butadiene), 2-methyl-1,3-butadiene (isoprene), 2,3-dimethyl-1,3-butadiene, 1,3-pentadiene (piperylene), 1,3-hexadiene, and the like. When the soft polymer block (B) has structural units derived from three or more repeat units, the structural units may be combined in any form such as random, tapered, block or any combination thereof.

The styrenic block copolymers may be prepared using free-radical, cationic and anionic initiators, or polymerization catalysts. Such polymers may be prepared utilizing bulk, solution or emulsion techniques as known in the art.

In a preferred embodiment, part or all unsaturated double bonds in the soft polymer block (B) of the styrenic block copolymer and/or in hard polymer block (A) if present, are hydrogenated. The hydrogenation ratio is generally 60% by mole or more, desirably 80% by mole or more, and preferably 100% by mole. In general, the hydrogenation or selective hydrogenation of the styrenic block copolymer may be accomplished using any of the numerous hydrogenation processes known to those of ordinary skill in the art. In a preferred embodiment, the amount of hard block ranges from about 10% to about 40% by weight based on the total weight of the styrenic block copolymer.

Optionally, the soft polymer block (B) can include small amounts of structural units derived from other copolymerizable monomers in addition to the structural units described. In this case, the proportion of the other copolymerizable monomers is generally 30% by weight or less, and preferably 10 percent by weight or less based on the total weight of the soft polymer block (B) of the styrenic block copolymer. Examples of other copolymerizable monomers include, for example, styrene, p-methylstyrene, α-methylstyrene, and other monomers that can undergo ionic polymerization.

Optionally, the styrenic block copolymer can be a functionalized styrenic block copolymer. An example of a functionalized styrenic block copolymer is a styrenic block copolymer having a reactive or crosslinkable hard block including aromatic vinyl repeat units and also preferably a crosslinkable soft block. The hard block generally has at least one of an alkylstyrene-derived functional group or structural unit having at least one alkyl group containing 1 to 8 carbon atoms combined with the benzene ring, and/or an aromatic vinyl monomer unit having a functional group, and at least one soft polymer block comprising two or more repeat units, that are the same or different, derived from one or more monomers, such as an olefin monomer, preferably having from 2 to about 12 carbon atoms, such as ethylene, propylene or butylene, or a diene, such as butadiene or isoprene, or a combination thereof. Such styrenic block copolymers are described in U.S. Pat. No. 7,074,855, herein fully incorporated by reference. A suitable hard block crosslinkable styrenic block copolymer is commercially available from Kuraray Co., Ltd. of Tokyo, Japan as SEPTON® V.

In a preferred embodiment, styrenic block copolymers are styrene-ethylene/butylene-styrene, styrene-butadiene-styrene, styrene-ethylene/propylene-styrene, styrene-isoprene-styrene block copolymers, such as known in the art as SEBS and SEPS block copolymers. Styrenic block copolymers are available in the art from sources such as Kraton Polymers of Houston, Tex. Suitable styrenic block copolymers are available from Kraton Polymers under the Trade Name KRATON® G1651H, which is a linear copolymer based on styrene and ethylene/butylene with a polystyrene content of about 30%, and as KRATON® MD6945 with a polystyrene content of about 13%. The melt viscosity for the suitable styrenic block copolymer ranges from about 1950 to about 36,000 Pa·s measured at 230° C. at a shear rate 11 1/s.

In one embodiment of the invention, at least one of the styrenic block copolymers present has a modulus that ranges from about 2.0 E+5 Pa to about 7.0 E+6 Pa, and preferably from 5.0 E+5 Pa to about 5.0 E+6 Pa·s measured using a Dynamic Mechanical Analyzer following ASTM D4065. The utilization of a relatively low modulus styrenic block copolymer leads to the overall softness of the composition, which is desired in the present invention. In a further embodiment, one or more additional styrenic block copolymers are utilized which have a higher modulus greater than 7.0 E+6 Pa. It has been found that the low modulus styrenic block copolymer utilized in the present invention requires relatively lower amounts of softener in order to process the same. The low modulus styrenic block copolymer also requires lower amounts of flame retardants, when compared to relatively high modulus styrenic block copolymers. The chemical structure of the low modulus styrenic block copolymer is not critical, so long as the block copolymer can impart reasonable melt strength at temperatures at or above 200° C. The hardness of the styrenic block copolymer ranges generally from about Shore A 11 to about Shore A 90, and preferably from about Shore A 30 to about Shore A 70.

Polyolefin Polymer or Copolymer

In one embodiment, the compositions of the present invention include one or more of a polyolefin polymer and a polyolefin copolymer. Polyolefins suitable for use in the compositions of the present invention comprise amorphous or crystalline homopolymers or copolymers of two or more different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low-density polyethylene, high-density polyethylene, linear-low-density polyethylene, polypropylene (isotactic and syndiotactic), ethylene/propylene copolymers, polybutene, and olefinic block copolymers. Polyolefin copolymers can also include the greater part by weight of one or more olefin monomers and a lesser amount of one or more non-olefin monomers such as vinyl monomers including vinyl acetate, or a diene monomer, EPDM, etc. Generally, a polyolefin copolymer includes less than 50 weight percent of a non-olefin monomer, desirably less than 30 weight percent, and preferably less than about 10 weight percent of a non-olefin monomer.

In a further embodiment, the polyolefin can include at least one functional group per chain or can be a blend of non-functionalized polyolefins and functionalized polyolefins. Functional groups can be incorporated into the polyolefin by the inclusion of for example, one or more non-olefin monomers during polymerization of the polyolefin. Examples of functional groups include, but are not limited to, anhydride groups such as maleic anhydride, itaconic anhydride and citraconic anhydride, acrylates such as glycidyl methacrylate, acid groups such as fumaric acid, itaconic acid, citraconic acid and acrylic acid, epoxy functional groups, and amine functional groups. Functional group-containing polyolefins and methods for forming the same are well known to those of ordinary skill in the art. Functionalized polyolefins are available commercially from sources such as Uniroyal, Atofina, and DuPont. Epoxy modified polyethylenes are available from Atofina as LOTADER®. Acid modified polyethylenes are available from DuPont as FUSABOND®.

Polyolefins utilized in the present invention are chosen so as to have sufficient ability to flow under pressure and can relatively easily form intended articles in the molten state, but also allow the final composition to have a desired softness, sufficient mechanical strength and allow for desirable flame retardant properties.

Of the olefinic polymers, polypropylene is preferred at least in part to ease of molding and processability, resistance to chemicals and cost, and imparting mechanical properties. Low density polyethylene is preferably utilized in addition to polypropylene or another polyolefin polymer or copolymer in one embodiment of the invention.

Polyolefin polymers and copolymers are commercially available from sources including, but not limited to, Chevron, Dow Chemical, DuPont, Exxon Mobil, Huntsman Polymers, Ticona and Westlake Polymer under various designations.

The amount of the polyolefin polymer or copolymer, when present, can be utilized in the compositions of the present invention in an amount generally from about 3 to about 60 parts, desirably from about 5 to about 50 parts, and preferably from about 10 to about 40 parts, based on 100 parts by weight of the styrenic block copolymer.

Polyacrylate Polymers and Copolymers

In one embodiment of the present invention, the compositions include at least one polyacrylate polymer or copolymer, or combinations thereof. In a further embodiment of the present invention, both acrylate (co)polymers and polyolefin (co)polymers can be utilized in a composition. It has been unexpectedly and surprisingly found that acrylate polymers or copolymers when present in the compositions of the present invention, including a styrenic block copolymer and flame retardant including a phosphorus-containing flame retardant, provide an unexpected enhancement of flame retarding effectivity of the system. It is believed that thermal crosslinking of polyacrylate polymers or copolymers, such as at relatively high temperatures, i.e., about 200° C. or more in the case of ethylene vinyl acetate, enhances melt strength of the composition, and aids the composition in passing the VL 94 V-0 vertical burn test, without substantial dripping. Furthermore, polyacrylate polymers or copolymers are believed to enhance the char formation when a platelet filler such as organically modified clay is utilized. Acrylate polymers and copolymers are also believed to impart melt strength at high temperatures.

Acrylate polymers and copolymers are derived from at least one acrylate group containing monomer, and/or monomers, reactants, etc. that react to form an acrylate group. The acrylate monomer generally has the following formula:

$CH_2 = CH(R^1)(COOR^2)$, wherein $R^1$ is H or $CH_3$ and $R^2$ is an alkyl chain with 1 to about 20 carbon atoms. Such acrylate monomers are known in the art and include, for example, vinyl acetate, acrylate and methylacrylate esters, for example, methylacrylate, methylmethacrylate, ethyl-acrylate, ethyl methylacrylate, isopropyl acrylate, isopropyl methacrylate, butyl acrylate, butyl methylacrylate, 2-ethylhexyl acrylate, 2-ethylhexyl methacrylate, and the like. The acrylate monomer can also be acrylamide. Acrylate copolymers are formed from at least one acrylate monomer and at least one non-acrylate monomer, such as an olefin monomer, diene monomer or vinyl aromatic monomer. Examples of acrylate polymers and copolymers include, but are not limited to, ethylene vinyl acetate, poly(methyl acrylate), poly(methyl methacrylate), polyacrylate rubber, and polyacrylamide.

In one embodiment of the present invention, acrylate polymers that are thermally crosslinkable are preferred. Ethylene vinyl acetate is an example of a thermally crosslinkable acrylate copolymer.

Suitable polyacrylate polymers are available from DuPont, Wilmington, Del., as ELVAX® and VAMAC® and Lubrizol Advanced Materials, Inc., Cleveland, Ohio as HYCAR®.

When the compositions of the present invention include an acrylate polymer or copolymer, such compositions are desirably processed below the thermal crosslinking temperature of the polyacrylate polymer or copolymer, generally about 200°

C. As such, the end products, when burned, exceed the thermal crosslinking temperature of the polyacrylate polymer or copolymer present within the composition. It has been found that the acrylate polymer or copolymer viscosity increases greatly above the thermal crosslinking temperature and thereby unexpectedly enhancing melt strength of the composition, even in the absence of a crosslinker. Thus, the polyacrylate polymers or copolymers when utilized in the present invention can crosslink inherently under burning conditions and increase the viscosity and melt strength of the composition and thereby reduce dripping of the same.

The amount of polyacrylate polymer or copolymer that can be utilized in the compositions of the present invention ranges in an amount generally from about 0 or about 1 to about 100 parts, desirably from about 3 to about 50 parts, and preferably from about 5 to about 30 parts based on 100 parts by weight of the styrenic block copolymer. When relatively high amounts of acrylate, polymers or copolymers are utilized in the present invention, it may be desirable to include a compatibilizer as the acrylate polymers or copolymers are polar polymers and the styrenic block copolymers and polyolefins are generally non-polar.

Softeners

Compositions of the present invention include a softener such as a mineral oil softener, or synthetic resin softener, or combinations thereof. The softener can beneficially reduce the temperatures at which the compositions are processable. Oil softeners are generally mixes of aromatic hydrocarbons, naphthene hydrocarbons and paraffin, i.e., aliphatic, hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". In one embodiment, paraffin oils and/or plasticizers are preferably utilized as a softener in compositions of the present invention. Examples of synthetic resin softeners include, but are not limited to, polyisobutylene, polybutenes and low molecular weight polybutadienes. The softener, when present, is utilized in an amount generally from about 5 to about 90 or about 100 parts by weight, and preferably from about 10 to 60 parts by weight per 100 total parts by weight of the styrenic block copolymer.

Flame Retardants

The compositions of the present invention include one or more, desirably two or more flame retardants including at least an inorganic phosphorus-containing flame retardant. Compositions according to the present invention are substantially free of a halogen-containing flame retardant, and generally contain less than 5 parts by weight, desirably less than 3 parts by weight, and preferably less than 1 part by weight of a halogen-containing flame retardant per 100 parts by weight of the styrenic block copolymer. Most preferably, compositions of the present invention are free of a halogen-containing flame retardant.

Inorganic phosphorus-containing flame retardants are generally salts of polyphosphoric acid. The inorganic phosphorus-containing flame retardants have been found to increase the oxygen index (OI) of the composition and reduce the occurrence of flaming drips of a composition when burned. Inorganic phosphorus-containing flame retardants include, but are not limited to, ammonium phosphate such as ammonium orthophosphates, e.g., $NH_4H_2PO_4$, $(NH_4)_2HPO_4$; ammonium diphosphates, e.g., $NH_4H_3P_2O_7$, $(NH_4)_2H_2P_2O_7$, $(NH_4)_3HP_2O_7$, $(NH_4)_4P_2O_7$; ammonium polyphosphate such as those with crystal structure phase 1 or crystal structure phase 2 known in the art; red phosphorus; or a combination thereof. Red phosphorus is an inorganic phosphorus-containing flame retardant generally utilized when compositions contain nylon. Accordingly, ammonium phosphate and ammonium polyphosphate are preferred inorganic phosphorus-containing flame retardants of the present invention. The inorganic phosphorus-containing flame retardant is present in an amount generally from about 5 or about 10 to about 70 parts, desirably from about 20 to about 60 parts, and preferably from about 30 to about 55 parts based on 100 total parts by weight of the styrenic block copolymer, polyolefin (co) polymer, acrylate (co)polymer and softener present in the composition.

Flame retardants of the present invention further include one or more melamine-containing flame retardants that can be utilized in conjunction with, or even in place of, the inorganic phosphorus-containing flame retardants. The melamine-containing flame retardants can be utilized in amounts provided for the inorganic phosphorus-containing flame retardants herein incorporated by reference. Like the inorganic phosphorus-containing flame retardants, the melamine-containing flame retardants can also be utilized advantageously for the intumescent coating of combustible materials. Examples of melamine-containing flame retardants include, but are not limited to, a melamine such as a melamine orthophosphate, e.g. $C_3H_6N_6.H_3PO_4$, $2C_3H_6N_6.H_3PO_4$, $3C_3H_6N_6.2H_3PO_4$, $C_3H_6N_6.H_3PO_4$, melamine diphosphate, e.g. $C_3H_6N_6.H_4P_2O_7$, $2C_3H_6N_6.H_4P_2O_7$, $3C_3H_6N_6.H_4P_2O_7$ or $4C_3H_6N_6.H_4P_2O_7$, melamine polyphosphate, melamine borate, melamine cyanurate, melamine borophosphate, melamine 1,2-phthalate, melamine 1,3-phthalate, melamine 1,4-phthalate, melamine guanidate, melamine thicydiamide, melamine oxalate, or a combination thereof.

In one embodiment of the present invention, it is desirable to utilize one or more synergistic compounds in addition to the inorganic phosphorus-containing flame retardant and/or melamine-containing flame retardants to enhance flame retardant properties of the final composition. In one embodiment, the additive is one or more polyalcohols such as pentaerythritol, dipentaerythritol, tris-(2-hydroxyethyl) iso-cyanurate, or a combination thereof.

In a preferred embodiment of the present invention, at least one flame retardant, such as the inorganic phosphorus-containing flame retardant or the melamine-containing flame retardant, or a combination thereof, has a surface coating thereon, whereby at least a flame retardant is encapsulated within a coating agent, which modifies the properties of the flame retardant and can for example decrease the water solubility of the flame retardant. That said, one or more components of the present invention can have a surface coating thereon. Two or more components utilized in the present invention can be present as a mixture and have a surface coating thereon. The surface coated composition comprising at least one surface coating agent encapsulating a composition comprising an inorganic phosphorus-containing flame retardant and/or melamine-containing flame retardant is present in an amount from about 5 or about 10 to about 70 parts, desirably from about 20 to about 60 parts, and preferably from about 30 to about 55 parts based on 100 total parts by weight of the styrenic block copolymer, polyolefin (co) polymer, acrylate (co)polymer and softener present in the composition.

Various processes for modifying the surface of flame retardants by encapsulating the particles within a coating can be utilized. U.S. Pat. No. 4,639,331, herein incorporated by reference, describes a process for preparing hydrolysis-stable, water-insoluble ammonium polyphosphates by coating with, respectively, melamine-formaldehyde resins and phenol-formaldehyde resins. European Patent No. 0180790, herein incorporated by reference, also discloses coated, powder ammonium polyphosphate in which polyurea, a reaction product made from isocyanate and water, is used for the encapsulation procedure. Cured silicone resins have also been described as coating material, see for example JP-A-3-131508, herein incorporated by reference. The reference teaches encapsulation of ammonium polyphosphate as a slurry in an organic solvent with a curable silicone resin, where small amounts of aminotriethoxysilane are used as a curing agent. U.S. Pat. No. 6,444,315, herein fully incorporated by reference, teaches applying a surface coating of an organofunctional-silane or a mixture of organofunctional silanes, an oligomeric organosiloxane or a mixture of oligomeric organosiloxanes, or a solvent-containing preparation based on monomeric organosilanes and/or oligomeric organosiloxanes, or a preparation based on water-soluble organopolysiloxanes to a powder flame retardant.

The organofunctional silanes used are preferably alkoxysilanes with aminoalkyl or epoxyalkyl or acryloxyalkyl or methacryloxyalkyl or mercaptoalkyl or alkenyl or alkyl functionality, and in a suitable method the above-mentioned hydrocarbon moieties contain from 1 to 8 carbon atoms and the alkyl groups may be linear, branched or cyclic. Particularly preferred organofunctional alkoxysilanes are: 3-aminopropyltri-alkoxysilanes, 3-aminopropylmethyldialkoxysilanes, 3-glycidyloxy-propyltrialkoxy-silanes, 3-acryloxypropyltrialkoxysilanes, 3-methacryloxypropyl-rialkoxy-silanes, 3-mercapto-propyltrialkoxysilanes, 3-mercaptopropylmethyldialkoxy-silanes, vinyltrialkoxysilanes, vinyltris(2-methoxyethoxy)silane, propyltrialkoxy-silanes, butyltrialkoxysilanes, pentyltri-alkoxysilanes, hexyltrialkoxysilanes, heptyltri-alkoxysilanes, octyltrialkoxysilanes, propyl-methyldialkoxysilanes and butylmethyl-dialkoxysilanes, and the alkoxy groups are preferably methoxy, ethoxy or propoxy groups.

The oligomeric organosiloxanes which can be used are preferably in particular those found in U.S. Pat. No. 5,282,998 and U.S. Pat. No. 5,932,757, hereby incorporated by reference. It is preferable to use those which, as substituents, have (i) alkyl and alkoxy groups, in particular linear, branched or cyclic alkyl groups having from 1 to 24 carbon atoms and alkoxy groups having from 1 to 3 carbon atoms, or (ii) vinyl and alkoxy groups and, if desired, alkyl groups, in particular alkoxy groups having from 1 to 3 carbon atoms and, if desired, linear, branched or cyclic alkyl groups having from 1 to 24 carbon atoms, where the abovementioned oligomeric organoalkoxysiloxanes preferably have a degree of oligomerization of from 2 to 50, particularly preferably from 3 to 20. Particular preference is given here to oligomeric methoxysilanes with vinyl functionality, or oligomeric methoxysilanes with propyl functionality.

In one process a solvent may be used which contains preparation based on monomeric organoalkoxysilanes and/or on oligomeric organoalkoxysiloxanes, where this preferably comprises methanol, ethanol, n-propanol, isopropanol and/or water as solvent. Such solvent-containing preparations may also comprise emulsifiers. Preparations based on water-soluble organopolysiloxanes, as found in particular in U.S. Pat. Nos. 5,629,400; 5,679,147; 5,885,341 and European Patent No. 0675128 A1, all of which are hereby incorporated by reference, may advantageously be used.

Further surface coated flame retardants are disclosed in U.S. Pat. No. 6,291,068, herein fully incorporated by reference. Therein, the surface coating is a thermoplastic resin which coats a core material comprising ammonium polyphosphate and, for example, thermosetting resin, a melamine monomer or a surface-treating agent.

In a preferred embodiment of the present invention, it is desirable to utilize a surface treated flame retardant mixture including one or more flame retardants, such as one or more of inorganic phosphorus-containing flame retardants and melamine-containing flame retardants. In a further embodiment, one or more additional compounds are contained within the surface coated flame retardant mixture, such as a polyalcohol, such as pentaerythritol. In a preferred embodiment, a surface coated flame retardant is utilized comprising a core mixture comprising an inorganic phosphorus-containing flame retardant and a polyalcohol, preferably pentaerythritol. A specific coated flame retardant is available from Budenheim Iberica Commerical, Spain as Budit 3704, Budit 3157 or Budit 3167, with the latter being preferred.

Examples of other flame retardants suitable for use in the present invention include, but are not limited to, hydrated metal compounds such as aluminum hydroxide, aluminum trihydrate, boehmite lumina, layered double hydroxide derived from alkoxides, magnesium hydroxide, calcium aluminate; nitrogen-containing inorganics; ammonium carbonate; molybdenum compounds; silicone polymers and powder; triazine compounds; guanidine compounds; metal oxides such as antimony trioxide and antimony oxide; zinc-based compounds such as zinc sulfide, zinc stannate and zinc borate; metal nitrates; organic metal complexes and low melting glasses. In one embodiment, one or more flame retardants can be provided with a surface coating as described hereinabove, if desired.

Additional flame retardants/plasticizers suitable for use in the present invention, preferably when one or more acrylate (co)polymers are present, are compounds that facilitate processing of the compositions and increase the flexibility and toughness of the final composition. Suitable plasticizers include compounds such as phosphate-ester plasticizers, which are known in the art to impart flame retardant properties. Phosphate esters include, but are not limited to, triaryl phosphates, alkyl diaryl phosphates and trialkyl phosphates. Non-limiting examples of triaryl phosphates include tricresyl phosphate, diphenol t-butyl phenol phosphate and diphenol isopropyl phenol phosphate. Alkyl diaryl phosphate esters are believed to act primarily in the polymer phase by forming phosphorus based acids during combustion which aid in char formation. Non-limiting examples of alkyl diaryl phosphate esters include 2-ethylhexyl diphenyl phosphate, isodecyl diphenyl phosphate. Typically trialkyl phosphates available are based on tri 2-ethylhexyl phosphate. Phosphate esters are commercially available from various sources such as Akzo, Ferro, Great Lakes and the like under designations such as Phosflex 71B, Santicizer 154, Rheophos 50, Phosflex 362, Phosflex 390, Santicizer 141, Santicizer 148, AC 005, Ferro 2148 and Santicizer 2248. Phosphate esters are polar materials and are more effective when an acrylate polymer is included in the composition. Various organic phosphorus containing compounds can be utilized as flame retardants including, but not limited to, phosphazenes, aryl/alkyl phosphates and phosphonates, phosphate esters, phosphorus-containing amines and phosphorus-containing polyols. The amount of the phosphate-ester plasticizer ranges generally from about 0 to about 30 parts per 100 parts of styrenic block copolymer, polyolefin (co)polymer, polyacrylate (co)polymer, and softener.

In a preferred embodiment, in addition to containing an inorganic phosphorus containing flame retardant, compositions of the present invention also include one or more of a metal oxide and a zinc based compound, in a total amount generally from 0 to about 20 parts, desirably from about 2 to about 15 parts, and preferably from about 3 to about 15 parts by weight per 100 total parts by weight of the phosphorus-containing flame retardants. It has been found that the combination of flame retardants increase the integrity and mechanical strength of the char of the composition when burned. Zinc borates are generally known to impart smoke suppressing qualities. Other flame retardant compounds can be present in the compositions of the present invention in various amounts.

Platelet Fillers

The compositions of the present invention include at least one platelet filler such as unmodified nanoclay, an organically modified clay, talc or mica.

Surprisingly, the incorporation of platelet organically modified clays in specified amounts to the compositions of the present invention do not appreciably increase the hardness of the compositions above a desired level.

The organically modified clays that may be utilized in one embodiment of the present invention generally have a particle size from about 1 to 10,000 nanometers and desirably from about 100 to about 1000 nanometers. In a preferred embodiment, it is desirable to use an organically modified clay, or an organoclay which can form a nanocomposite with the polyolefin and styrenic block copolymer. The organically modified clays are generally prepared by reacting a clay with an organic cation or cations provided by specific quaternary ammonium compounds.

The organoclays of the present invention at least differ from ordinary untreated clays in the fact that the untreated clays typically form only ordinary phase-separated mixtures when blended or mixed with a polymer and cannot be exfoliated or intercalated. The clays which are organically modified are more easily dispersed in the polymer matrix and can form a nanocomposite such as intercalated or exfoliated structures. It is preferable to utilize a clay with an exfoliatable structure. Intercalated nanocomposites have polymer chains which are intercalated between the silicate layers of the clay resulting in a well ordered multilayer, where the layers of the clay retain their structural registry. Exfoliated nanocomposites are those in which the silicate clay layers or platelets having thickness on a nanometer scale, are exfoliated or substantially separated, i.e. mechanically, by shear mixing, and are randomly and highly dispersed throughout the continuous polymer matrix. It is also possible that the nanocomposites can be a mixture having both intercalated and exfoliated structures. It is believed the organically modified clays increase the effectiveness of the flame retardants by increasing the low shear viscosity substantially to prevent dripping from happening, and to increase the barrier property to slow down the diffusion of decomposed volatiles to the gas phase for burning. Surprisingly, the hardness of the compositions disclosed in this invention does not increase due to the incorporation of nanoclays.

In order to obtain better compatibility between the polyolefin and organoclay, it is desirable that the organoclay contains substituted alkyl side chains.

The types of clay minerals which can be utilized include, but are not limited to, smectite, vermiculite, halloysite, or any synthetic analogs or combinations thereof, with smectite-type clay being preferred. Smectite-type clays which are useful in preparing the required organoclays include montmorillonite, hectorite, bentonite, beidellite, stevensite, saponite, nontronite, sauconite, sobokite, svinfordite, and the like.

In one embodiment, the clays used to prepare the organophilic clay of this invention are cation-exchangeable smectite clays which have the cation exchange capacity of at least 50 miliequivalents per 100 grams of clay, 100 percent active basis (i.e. beneficiated and essentially free of non-clay impurities). Smectite-type clays are well known in science, geology and in the art of rheological additives, and are commercially available from a variety of sources both in the United States and throughout the world. They are unique among clays in that they exhibit the phenomena of swelling to many times their size when contacted with water.

The organic cations which can be reacted with a clay to form the organically modified clay utilized in the present invention can be selected from a variety of nitrogen-based quaternary materials that are capable of exchanging cations with the selected smectite-type clay. The organic cations which are reacted with the smectite-type clay to prepare the inventive organophilic clays have a positive charge localized on a single nitrogen atom within the compound.

In one embodiment of the invention, the organic cation is provided by quaternary ammonium compounds. Particularly useful are quaternary ammonium compounds which include those having the formula:

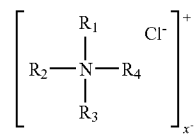

wherein $R_1$ comprises a group selected from (i) linear or branched aliphatic, aralkyl, or aromatic hydrocarbon groups having from 8 to 30 carbon atoms or (ii) alkyl or alkyl-ester groups having 8 to 30 carbon atoms; $R_2$, $R_3$, and $R_4$ are independently (a) linear or branched aliphatic hydrocarbon, fluorocarbon, or other halocarbon groups having from 1 to about 30 carbon atoms; (b) aralkyl or aromatic groups having from 6 to about 30 carbon atoms, (c) alkoxylated groups containing from 1 to about 80 moles of alkylene oxide; (d) amide groups, (e) oxazolidine groups, (f) allyl, vinyl, or other alkenyl or alkynyl groups possessing reactive unsaturation and having from 2 to about 30 carbon atoms, or (g) hydrogen; and X' comprises an anion selected from the group consisting of chloride, methyl sulfate, acetate, iodide, and bromide, preferably chloride. For purposes of this invention, quaternary phosphonium and sulfonium based salts are defined as within the definition of quaternary ammonium compound.

The raw materials used to make the quaternary ammonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha-olefins. Representative examples of useful branched, saturated radicals included 12-methylstearyl and 12-ethylstearyl.

Examples of useful aromatic groups include benzyl and benzylic-type materials derived from benzyl halides, benzhydryl halides, trityl halides, halo-phenylalkanes wherein the alkyl chain has from 1 to 30 carbon atoms, such as 1-halo-1-phenyloctadecane; substituted benzyl moieties, such as those derived from ortho-, meta-, and para-chlorobenzyl halides, para-methoxybenzyl halides, ortho-, meta-, and para-nitrilobenzyl halides, and ortho-, meta-, and para-alkylbenzyl halides wherein the alkyl chain contains from 1 to 30 carbon atoms; and fused ring benzyl-type moieties, such as those derived from 2-halomethylnaphthalene, 9-halomethylanthracene, and 9-halomethylphenanthrene, wherein the halo group comprises chloro, bromo, or any other such group which serves as a leaving group in the nucleophilic attack of the benzyl type moiety by a nitrogen atom to generate a substituted amine.

Examples of other aromatic groups include aromatic-type substituents such as phenyl and substituted phenyl; N-alkyl and N,N-dialkyl anilines, where the alkyl groups contain between 1 and 30 carbon atoms; ortho-, meta-, and para-nitrophenyl, ortho-, meta-, and para-alkyl phenyl, wherein the alkyl group contains between 1 and 30 carbon atoms; 2-, 3-, and 4-halophenyl wherein the halo group is defined as chloro, bromo, or iodo; and 2-, 3-, and 4-carboxyphenyl and esters thereof, where the alcohol of the ester is derived from an alkyl alcohol, wherein the alkyl group contains between 1 and 30 carbon atoms, aryl such as phenol, or aralkyl such as benzyl alcohols; and fused ring aryl moieties such as naphthalene, anthracene, and phenanthrene.

Preferred quaternary ammonium compounds for purposes of the invention comprises a quaternary ammonium salt that contains at least one, preferably two or three, hydrocarbon chains having from about 8 to about 30 carbon atoms and either no hydrophilic carbon chains or having hydrophilic radicals having a total of about 9 moles of ethylene oxide or less.

Some examples of preferred quaternary ammonium compounds to make the organoclays of this invention are: dimethyl bis[hydrogenated tallow]ammonium chloride (2M2HT), methyl benzyl bis[hydrogenated tallow]ammonium chloride (MB2HT), and methyl tris[hydrogenated tallow alkyl]chloride (M3HT).

Suitable organoclays for use in the present invention are available from Southern Clay Products, of Gonzales, Tex., as Cloisite 15A, Cloisite 20A, and SCPX-1967, from Nanocor, Inc. of Arlington Heights, Ill., trade name Nano #405, and from Rheox, Inc. (Elementis Specialties) of Hightstown, N.J., available as Benton 107, Benton 108, Benton 109. Preferred organoclays are Cloisite 15A, Cloisite 20A, Benton 108, Benton 109.

The amount of the nanoparticulates, preferably nanoclay and/or organoclay, utilized in the compositions of the present invention, is generally from 0 or about 0.5 to about 30 parts by weight, desirably from 0 or about 1 to about 20 parts by weight, and preferably from about 2 to about 15 parts by weight per 100 total parts by weight of the styrenic block copolymer.

Additives

If desired, the compositions of the present invention may include lubricants, light stabilizers, pigments, heat stabilizers, anti fogging agents, anti-stat agents, silicone oils, anti-blocking agents, UV absorbers, anti-oxidants, processing aids, plasticizers, mold release agents, flow enhancing agents, and non-platelet fillers. Examples of inorganic fillers for use in the compositions of the present invention include, but are not limited to, one or more of calcium carbonate, clay, silica, titanium oxide, carbon black, barium sulfate, glass fibers, whiskers, carbon fibers, magnesium carbonate, magnesium hydroxide, glass powders, metal powders, kaolin, graphite, and molybdenum disulfide. The optional components, independently, can be utilized within ranges not adversely affecting the performance of the compositions and are generally about 50 parts by weight or less per 100 parts by weight of the styrenic block copolymer. All additives should be screened for compatibility with the base formulation to insure that interference of char/ceramic formation is minimized.

The compositions of the present invention may also optionally include other polymers such as oxygen atom-containing polymers, for example oxide and/or ether group-containing polymers, e.g., polyphenylene oxide and polyphenylene ether, in an amount generally up to about 10 parts or about 50 parts by weight per 100 parts by weight of the styrenic block copolymer(s). The optional polymers are generally utilized to improve processability. The optional polymers are chosen so they do not substantially impair flame retardant properties of compositions of the present invention.

Preferred compositions of the present invention after melt blending to form a substantially homogeneous mixture are relatively soft compositions that can surprisingly pass the UL 94 V-0 burn test. The compositions of the present invention have a Shore A hardness that ranges from about 40 to about 90 as measured by ASTM 2240.

Methods of Preparation

In one embodiment, the compositions of the present invention are formed by blending the desired components in one or more steps, preferably by mixing, heating the components of the composition to obtain a melted composition without substantially degrading the components thereof, and mixing the melted composition, preferably to substantially disperse the components thereof. Melt blending is performed at a temperature generally from about 170° C. to about 230° C. and preferably from about 185° C. to about 195° C. Compositions of the present invention can be prepared in a Banbury, two roll mill, a continuous mixer such as single screw or twin screw extruder, a kneader or any other mixing machine as known to those of ordinary skill in the art. After preparation of the compositions, they can be pelletized or diced utilizing appropriate equipment, if desired. Melt mixing time can vary, but is generally from about 2 to about 6 minutes, desirably from about 2 to about 5 minutes, and preferably from about 3 to about 5 minutes.

The compositions of the present invention are thermoplastics and can be molded and remolded as desired. Advantageously, preferred compositions of the present invention are capable of passing the UL 94 V-0 vertical burn test. The UL 94 V-0 test determines a material's tendency to either extinguish or to spread a flame once the material has been ignited. UL ratings relate to a material's behavior when introduced to a flame source. For a rating of 94 V-0, a material must be self-extinguishing and must not drip or run while burning. In the test, a sample of the material is held over a Bunsen burner, ignited, and allowed to burn. When the sample is removed from the flame, the fire must go out within 10 seconds, and the material must not have dripped from the burning sample. If the material continues to burn or if it drips and runs, it cannot be related 94 V-0. The UL 94 V-0 vertical burn test is herein incorporated by reference.

Molded articles obtained by molding the compositions of the present invention can be used in various applications such as electrical or electronic components, automotive, extrusions and co-extrusions. For example, the molded articles can be used in electronic parts or connectors, wires, cables, especially jacketing, instrumental panels, center panels, center console boxes, silencer gears, and other electric/electronic parts; and other articles.

The term "room temperature" means about 23° C. when utilized herein.

EXAMPLES

The present invention is illustrated in further detail with respect to the examples set forth herein, which are not intended to limit the scope of the invention.

Various example formulations set forth below were prepared as follows. Components of each respective composition were added to a Banbury and melt mixed at a temperature of about 185° C. to about 195° C. for about 5 minutes in order to disperse and mix the composition before being removed from the Banbury. Test samples were prepared according to the respective test method, such as by injection molding at 190° C., compression molding at 180° C. for 5 minutes and by extrusion at a temperature of about 185° C. to about 195° C.

TABLE 1

| | Example 1 |
|---|---|
| Component | |
| Styrenic Block Copolymer[1] | 100 |
| Polyolefin[2] | 27 |
| Softener[3] | 20 |
| Stabilizer (EPON 1002F) | 0.4 |
| Stabilizer (Irganox 1010) | 0.4 |
| Ammonium Polyphosphate[4] | 60 |
| Zinc Borate | 10 |
| TOTAL WEIGHT (parts) | 217.8 |
| Test | |
| Shore A Hardness, 15 sec. delay ASTM 2240) | 58 |
| UL 94 V-0 Vertical Burn Test | Pass |
| Tensile Strength, psi (ASTM D-412) | 719 |
| Elongation to Break, % (ASTM D-412) | 481 |

[1]Modulus $6.5 \times 10^5$ Pa at 21° C., 30% styrene from Kraton Co.
[2]Polypropylene, 12 MI
[3]Semtol 500 from Crompton Corp.
[4]Spinflam MF82/PP (Solaris Group) $(NH_4)_{m+2}P_mO_{3m+1}$ M = 1000-3000

The modulus of the styrenic block copolymer utilized was about 6.5 E+5 Pa at room temperature. It retained a modulus of about 2.5 E+5 Pa even at 200° C. The example shows that a soft zero halogen flame retardant composition which passes the UL 94 V-0 test can be achieved utilizing a low modulus styrenic block copolymer and ammonium polyphosphate as a flame retardant additive.

TABLE 2

| | Example 2 | Example 3 |
|---|---|---|
| Component | | |
| Styrenic Block Copolymer[1] | 100 | 100 |
| Polypropylene[2] | 10 | 10 |
| Softener[3] | 35 | 30 |
| Ammonium Polyphosphate[4] | 72.5 | 70 |
| Zinc Borate | 10 | 10 |
| Stabilizer (EPON 1002F) | 0.6 | 0.6 |
| Stabilizer (Tinuvin 327) | 2 | 2 |
| Stabilizer (DLTDP) | 1 | 1 |
| Stabilizer (Irganox 1010) | 0.25 | 0.25 |
| Stabilizer (Irganox 1024 MD) | 0.5 | 0.5 |
| Lubricant (Crodomide ER) | 1.5 | 1.5 |
| TOTAL WEIGHT (parts) | 233.35 | 225.85 |
| Test | | |
| Shore A Hardness, 15 sec. delay | 51 | 53 |
| UL 94 V-0 Vertical Burn Test | Fail | Pass |
| Tensile Strength, psi (ASTM D-412) | 340 | 418 |
| Elongation to Break, % (ASTM D-412) | 776 | 825 |

[1]Kraton ® MD6945, modulus $6.4 \times 10^5$ Pa at 20° C., and $4.3 \times 10^4$ Pa at 200° C.
[2]Polypropylene (12 MI)
[3]Semtol 500 from Crompton Corp.
[4]Budit 3167 from Budenheim Table 2 illustrates that zero halogen thermoplastic elastomer compositions can be formed, as in Example 3, including a low modulus styrenic block copolymer and ammonium polyphosphate, with low amounts of softener which pass the UL 94 V-0 vertical burn test while allowing the compositions to still achieve a relatively low hardness.

TABLE 3

| | Example 4 | Example 5 |
|---|---|---|
| Component | | |
| Styrenic Block Copolymer[1] | 75 | 75 |
| Styrenic Block Copolymer[2] | 25 | 25 |
| Polypropylene[3] | 10 | 10 |
| Softener[4] | 35 | 35 |
| Ammonium Polyphosphate[6] | 72.5 | 72.5 |
| Zinc Borate | 10 | 10 |
| Nanoclay[5] | 0 | 4.35 |
| Stabilizer (EPON 1002F) | 0.6 | 0.6 |
| Stabilizer (Tinuvin 327) | 2 | 2 |
| Stabilizer (DLTDP) | 1 | 1 |
| Stabilizer (Irganox 1010) | 0.25 | 0.3 |
| Stabilizer (Irganox 1024MD) | 0.5 | 0.25 |
| Lubricant (Crodomide ER) | 1.5 | 1.5 |
| TOTAL WEIGHT (parts) | 233.35 | 237.50 |
| Test | | |
| Shore A Hardness 15 sec. delay | 56 | 56 |
| UL 94 V-0 Vertical Burn Test | Pass | Pass |
| Tensile Strength, psi (ASTM D-412) | 482 | 496 |
| Elongation to Break, % (ASTM D-412) | 785 | 774 |

[1]Kraton ® MD6945
[2]Kraton ® G1651, modulus $2.9 \times 10^6$ Pa at 20° C.
[3]Polypropylene (12 MI)
[4]Semtol 500
[5]Bentone 108
[6]Budit 3167 from Budenheim Table 3 illustrates that zero halogen thermoplastic elastomer compositions that are flame retardant can be formed utilizing a low modulus styrenic block copolymer as well as a high modulus styrenic block copolymer, ammonium polyphosphate, and optionally an organically modified clay. Comparing Example 4 to Example 2, surprisingly, the incorporation of high modulus styrenic block copolymer improved the UL 94 V-0 vertical burn test results. Comparing Example 4 to Example 5, surprisingly, the incorporation of nanoclays does not increase hardness.

TABLE 4

| | Example 6 | Example 7 | Example 8 |
|---|---|---|---|
| Component | | | |
| Styrenic Block Copolymer[1] | 100 | 100 | 100 |
| Acrylate Copolymer[2] | 0 | 50 | 50 |
| Functionalized polyolefin[3] | 0 | 10 | 0 |
| Phosphate Plasticizer[4] | 30 | 30 | 30 |
| Ammonium Polyphosphate[5] | 39 | 57 | 90 |

TABLE 4-continued

|  | Example 6 | Example 7 | Example 8 |
|---|---|---|---|
| Zinc Borate | 10 | 10 | 0 |
| Stabilizer (EPON 1002F) | 0.6 | 0.6 | 0.6 |
| Stabilizer (Irganox 1010) | 0.4 | 0.4 | 0.4 |
| TOTAL WEIGHT (parts) | 180 | 258 | 271 |
| Test |  |  |  |
| Shore A Hardness, 15 sec. | 32 | 56 | 52 |
| UL 94 V-0 Vertical Burn Test | Fail | Pass | Pass |
| Tensile Strength, psi (ASTM D-412) | 342 | 840 | 675 |
| Elongation to Break, % (ASTM D-412) | 624 | 736 | 679 |

[1]Modulus $6.5 \times 10^5$ Pa at 21° C., 30% styrene from Kraton Company.
[2]Elvax 265 (EVA)
[3]Fusabond C MC250D
[4]Santizer 2148 from Solutia.
[5]Budit 3167 from Budenheim Compositions set forth in Table 4 include a styrenic block copolymer which includes, in the case of the Examples 7 and 8 of the present invention, an acrylate copolymer which surprisingly allows the compositions to pass the UL 94 V-0 burn test. Example 6 does not include the acrylate copolymer and does not pass the UL 94 V-0 burn test.

It is noted that the amounts of APP in compositions Example 6 and Example 7 expressed as the ratio of APP/(sum of polymers and oil), are to be the same at 30%. It illustrates that the UL 94 V-0 burn test for a soft TPE can be improved by the incorporation of an acrylate, EVA, in a styrenic block copolymer.

Comparing Example 7 to Example 5, an increase of the amount of APP to Example 8 can also improve V-0 burn test. Surprisingly, the hardness of Example 8 is not increased with an increased amount of APP. This offers a broader formulation window for making a soft flame retardant TPE according to this invention.

In accordance with the patent statutes, the best mode and preferred embodiment have been set forth; the scope of the invention is not limited thereto, but rather by the scope of the attached claims.

What is claimed is:

1. A soft, flame retardant thermoplastic elastomer composition, comprising:
a styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block is derived from monomer units of one or more of an olefin monomer and a diene monomer, wherein the at least one hard polymer block ranges from about 10 percent to 40 percent by weight based on the total weight of the styrenic block copolymer;
one or more of a) a polyolefin polymer, b) a polyolefin copolymer, the polyolefin copolymer derived from polymerization of two or more different monomers c) a polyacrylate polymer, and d) a polyacrylate copolymer, wherein when the a) polyolefin polymer or b) polyolefin copolymer or both the a) polyolefin polymer and the b) polyolefin copolymer are present the amount ranges from about 3 to about 60 parts based on 100 parts by weight of the styrenic block copolymer, and wherein when the c) polyacrylate polymer or d) polyacrylate copolymer or both the c) polyacrylate polymer and the d) polyacrylate copolymer are present the amount ranges from about 1 to about 100 parts based on 100 parts by weight of the styrenic block copolymer;
a softener in an amount from about 5 to about 100 parts, based on 100 parts by weight of the styrenic block copolymer; and
a surface coated composition comprising a surface coating agent encapsulating an inorganic phosphorus-containing flame retardant in an amount from about 5 to about 70 parts per 100 total parts by weight of the styrenic block copolymer; a) polyolefin polymer, b) polyolefin copolymer, c) polyacrylate polymer or d) polyacrylate copolymer, or any combination of said a) a polyolefin polymer, b) a polyolefin copolymer, c) a polyacrylate polymer, and d) a polyacrylate copolymer present; and softener, and wherein the thermoplastic elastomer composition has a Shore A hardness of about 40 to about 90.

2. The thermoplastic elastomer composition according to claim 1, wherein the a) polyolefin polymer or the b) polyolefin copolymer or both the a) polyolefin polymer and the b) a polyolefin copolymer are present, wherein the thermoplastic elastomer composition includes one or more of a metal oxide and a zinc-based compound in a total amount of about 2 to about 20 parts per 100 parts by weight of the surface coated composition.

3. The thermoplastic elastomer composition according to claim 2, wherein the c) polyacrylate polymer or the d) polyacrylate copolymer or both the c) polyacrylate polymer and the d) polyacrylate copolymer are present, and wherein the surface coated composition is present in an amount from about 10 to about 70 parts per 100 parts by weight of the styrenic block copolymer; the a) polyolefin polymer, the b) polyolefin copolymer, the c) polyacrylate polymer or d) polyacrylate copolymer or any combination of said a), b), c) and d) present; and softener.

4. The thermoplastic elastomer composition according to claim 2, wherein the thermoplastic elastomer composition further comprises a platelet filler comprising one or more of a nanoclay, an organically modified clay, talc and mica in an amount from about 0.5 to about 30 parts per 100 parts by weight of the styrenic block copolymer.

5. The thermoplastic elastomer composition according to claim 2, wherein the composition further comprises a high modulus styrenic block copolymer having a modulus greater than 7.0 E+6 Pa.

6. The thermoplastic elastomer composition according to claim 2, wherein the a) polyolefin polymer or the b) polyolefin copolymer or a combination thereof is present in an amount from about 5 to about 50 parts per 100 parts by weight of the styrenic block copolymer, wherein the softener is present in an amount from about 10 to about 60 parts per 100 parts by weight of the styrenic block copolymer, and wherein the surface coated composition is present in an amount from about 20 to about 60 parts per 100 parts by weight of the styrenic block copolymer; the a) polyolefin polymer, the b) polyolefin copolymer, the c) polyacrylate polymer or d) polyacrylate copolymer or any combination of said a), b), c) and d) present; and softener.

7. The thermoplastic elastomer composition according to claim 2, wherein the surface coated composition further includes a polyalcohol encapsulated by the surface coating agent, and wherein the surface coating agent is one or more of a melamine-formaldehyde resin, a phenol-formaldehyde resin, a polyurea, a silicone resin, an organofunctional-silane, and an oligomeric organosiloxane.

8. A soft, flame retardant thermoplastic elastomer composition, comprising:
- a styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block is derived from monomer units of one or more of an olefin monomer and a diene monomer, wherein the at least one hard polymer block ranges from about 10 percent to 40 percent by weight based on the total weight of the styrenic block copolymer;
- one or more of a a) polyolefin polymer, b) a polyolefin copolymer, the polyolefin copolymer derived from polymerization of two or more different monomers c) a polyacrylate polymer, and d) a polyacrylate copolymer, wherein when the a) polyolefin polymer or b) polyolefin copolymer or both the a) polyolefin polymer and the b) polyolefin copolymer are present the amount ranges from about 3 to about 60 parts based on 100 parts by weight of the styrenic block copolymer, and wherein when the c) polyacrylate polymer or d) polyacrylate copolymer or both the c) polyacrylate polymer and the d) polyacrylate copolymer are present the amount ranges from about 1 to about 100 parts based on 100 parts by weight of the styrenic block copolymer;
- a softener in an amount from about 5 to about 100 parts, based on 100 parts by weight of the styrenic block copolymer;
- an inorganic phosphorus-containing flame retardant in an amount from about 5 to about 70 parts based on 100 parts by weight of the styrenic block copolymer; a) polyolefin polymer, b) polymer copolymer, c) polyacrylate polymer or d) polyacrylate copolymer or any combination of said a) a polyolefin polymer, b) a polyolefin copolymer, c) a polyacrylate polymer, and d) a polyacrylate copolymer present; and softener; and
- an organically modified clay in an amount from about 0.5 to about 30 parts per 100 parts by weight of the styrenic block copolymer, said clay modified with a quaternary ammonium compound, and wherein the composition has a Shore A hardness of about 40 to about 90.

9. The thermoplastic elastomer composition according to claim 8, wherein the a) polyolefin polymer or the b) polyolefin copolymer or both the a) polyolefin polymer and the b) polyolefin copolymer are present, and wherein the composition includes one or more of a metal oxide and a zinc-based compound in a total amount of 2 to about 20 parts per 100 parts by weight of the inorganic phosphorus-containing flame retardant.

10. The thermoplastic elastomer composition according to claim 9, wherein the c) polyacrylate polymer or the d) polyacrylate copolymer or both the c) polyacrylate polymer and the d) polyacrylate copolymer are present, and wherein the inorganic phosphorus-containing flame retardant is present in an amount from about 10 to about 70 parts per 100 parts by weight of the styrenic block copolymer; the a) polyolefin polymer, b) polyolefin copolymer, c) polyacrylate polymer or d) polyacrylate copolymer or any combination of said a), b), c), and d) present; and softener.

11. The thermoplastic elastomer composition according to claim 9, wherein the composition further comprises a high modulus styrenic block copolymer having a modulus greater than 7.0 E+6 Pa.

12. The thermoplastic elastomer composition according to claim 8, wherein the a) polyolefin polymer or b) polyolefin copolymer or a combination thereof is present in an amount from about 5 to about 50 parts per 100 parts by weight of the styrenic block copolymer, wherein the softener is present in an amount from about 10 to about 60 parts per 100 parts by weight of the styrenic block copolymer, and wherein the inorganic phosphorus-containing flame retardant is present in an amount from about 20 to about 60 parts per 100 parts by weight of the styrenic block copolymer; the a) polyolefin polymer, the b) polyolefin copolymer, the c) polyacrylate polymer or d) polyacrylate copolymer or any combination of said a), b), c) and d) present; and softener.

13. The thermoplastic elastomer composition according to claim 9, wherein the inorganic phosphorus-containing flame retardant has a surface coating thereon to reduce solubility upon exposure to water.

14. The thermoplastic elastomer composition according to claim 13, wherein the surface coating further encapsulates a polyalcohol in addition to the inorganic phosphorus-containing flame retardant.

15. The thermoplastic elastomer composition according to claim 9, wherein the polyolefin polymer or the polyolefin copolymer comprises a functionalized polyolefin polymer or copolymer.

16. A soft, flame retardant thermoplastic elastomer composition, comprising:
- a styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block is derived from monomer units of one or more of an olefin monomer and a diene monomer, wherein the at least one hard polymer block ranges from about 10 percent to 40 percent by weight based on the total weight of the styrenic block copolymer;
- a second styrenic block copolymer having a modulus greater than 7.0 E+6 Pa, wherein the second styrenic block copolymer has at least one hard polymer block derived from at least two aromatic vinyl compound units, and has at least one soft polymer block, wherein the soft polymer block includes at least one repeat unit derived from an olefin or a diene;
- one or more of a) a polyolefin polymer, b) a polyolefin copolymer the polyolefin copolymer derived from polymerization of two or more different monomers c) polyacrylate polymer, and d) a polyacrylate copolymer, wherein when the a) polyolefin polymer or b) polyolefin copolymer or both the a) polyolefin polymer and the b) polyolefin copolymer are present the amount ranges from about 3 to about 60 parts based on 100 parts by weight of the styrenic block copolymer, and wherein when the c) polyacrylate polymer or d) polyacrylate copolymer or both the c) polyolefin polymer and the d) polyacrylate copolymer are present the amount ranges from about 1 to about 100 parts based on 100 parts by weight of the styrenic block copolymer;
- a softener in an amount from about 5 to about 100 parts, based on 100 total parts by weight of the styrenic block copolymers; and
- an inorganic phosphorus-containing flame retardant in an amount from about 5 to about 70 parts based on 100 total parts by weight of the styrenic block copolymers; softener; and a) polyolefin polymer, b) polyolefin copolymer, c) polyacrylate polymer or d) polyacrylate copolymer, or any combination of said a) a polyolefin polymer, b) a polyolefin copolymer, c) a polyacrylate polymer, and d) a polyacrylate copolymer present.

17. The thermoplastic elastomer composition according to claim 16, wherein the inorganic phosphorus-containing flame retardant is present in a surface coated composition.

18. The thermoplastic elastomer composition according to claim 17, wherein the a) polyolefin polymer or the b) polyolefin copolymer or both the a) polyolefin polymer and the b) a polyolefin copolymer are present, wherein the thermoplastic elastomer composition includes one or more of a metal oxide and a zinc-based compound in a total amount of about 2 to about 20 parts per 100 parts by weight of the inorganic phosphorus-containing flame retardant.

19. The thermoplastic elastomer composition according to claim 18, wherein the c) polyacrylate polymer or the d) polyacrylate copolymer or both the c) polyacrylate polymer and the d) polyacrylate copolymer are present, and wherein the inorganic phosphorus-containing flame retardant is present in an amount from about 10 to about 70 parts per 100 parts by weight of the styrenic block copolymers; the a) polyolefin polymer, the b) polyolefin copolymer, the c) polyacrylate polymer or d) polyacrylate copolymer or any combination of said a), b), c), and d) present; and softener.

20. The thermoplastic elastomer composition according to claim 16, wherein the thermoplastic elastomer composition further comprises a platelet filler comprising one or more of a nanoclay, an organically modified clay, talc and mica in an amount from about 0.5 to about 30 parts per 100 parts by weight of the styrenic block copolymers.

21. The thermoplastic elastomer composition according to claim 17, wherein the a) polyolefin polymer or b) polyolefin copolymer or both a) polyolefin polymer, and b) a polyolefin copolymer are present in an amount from about 5 to about 50 parts per 100 parts by weight of the styrenic block copolymers, wherein the softener is present in an amount from about 10 to about 60 parts per 100 parts by weight of the styrenic block copolymers, and wherein the inorganic phosphorus-containing flame retardant is present in an amount from about 20 to about 60 parts per 100 parts by weight of the styrenic block copolymers; the a) polyolefin polymer, the b) polyolefin copolymer, the c) polyacrylate polymer or d) polyacrylate copolymer or any combination of said a), b), c), and d) present; and softener.

22. The thermoplastic elastomer composition according to claim 18, wherein the surface coated composition further includes a polyalcohol encapsulated by the surface coating agent, and wherein the inorganic phosphorus-containing flame retardant and polyalcohol are encapsulated in a surface coating agent.

23. A soft, flame retardant thermoplastic elastomer composition, comprising:
i) a styrenic block copolymer, ii) one or more of a) a polyolefin polymer, b) a polyolefin copolymer, the polyolefin copolymer derived from polymerization of two or more different monomers c) a polyacrylate polymer, and d) a polyacrylate copolymer, iii) a softener, and iv) a surface coated composition comprising a surface coated agent encapsulating an inorganic phosphorus-containing flame retardant;
the styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block is derived from monomer units of one or more of an olefin monomer and a diene monomer, wherein the at least one hard polymer block ranges from about 10 percent to 40 percent by weight based on the total weight of the styrenic block copolymer,
wherein when the a) polyolefin polymer or b) polyolefin copolymer or both the a) polyolefin polymer and the b) polyolefin copolymer are present the amount ranges from about 3 to about 60 parts based on 100 parts by weight of the styrenic block copolymer, and wherein when the c) polyacrylate polymer or d) polyacrylate copolymer or both the c) polyacrylate polymer and the d) polyacrylate copolymer are present the amount ranges from about 1 to about 100 parts based on 100 parts by weight of the styrenic block copolymer, and
wherein the thermoplastic elastomer composition has a Shore A hardness of about 40 to about 90.

24. The thermoplastic elastomer composition according to claim 23, wherein the a) polyolefin polymer or the b) polyolefin copolymer or both the a) and the b) are present, wherein the softener is present in an amount from about 5 to about 100 parts based on 100 parts by weight of a styrenic block copolymer, and wherein the surface coated composition is present in an amount from about 5 to about 70 parts per 100 parts by total weight of the styrenic block copolymer; the a) polyolefin polymer or b) polyolefin copolymer, or both the a) polyolefin polymer and the b) polyolefin copolymer; any c) polyacrylate polymer or d) polyacrylate copolymer present; and softener.

25. The thermoplastic elastomer composition according to claim 23, wherein thermoplastic elastomer composition includes one or more of a metal oxide and a zinc-based compound in a total amount of about 2 to about 20 parts per 100 parts by weight of the surface coated composition.

26. The thermoplastic elastomer composition according to claim 23,
wherein the c) polyacrylate polymer or the d) polyacrylate copolymer or both the c) polyacrylate polymer and the d) polyacrylate copolymer are present, and wherein the surface coated composition is present in an amount from about 5 to about 70 parts per 100 parts by weight of the styrenic block copolymer; any a) polyolefin polymer, and b) polyolefin copolymer present; the c) polyacrylate polymer or d) polyacrylate copolymer or both the c) and d); and softener.

27. The thermoplastic elastomer composition according to claim 23,
wherein the thermoplastic elastomer composition further comprises a platelet filler comprising one or more of a nanoclay, an organically modified clay, talc and mica in an amount from about 0.5 to about 30 parts per 100 parts by weight of the styrenic block copolymer.

28. The thermoplastic elastomer composition according to claim 23,
wherein the surface coated composition further includes a polyalcohol, and wherein the surface coating agent is one or more of a melamine-formaldehyde resin, a phenol-formaldehyde resin, a polyurea, a silicone resin, an organofunctional-silane, and an oligomeric organosiloxane.

29. A soft, flame retardant thermoplastic elastomer composition, comprising:
i) a styrenic block copolymer, ii) one or more of a) a polyolefin polymer, b) a polyolefin copolymer, the polyolefin copolymer derived from polymerization of two or more different monomers c) a polyacrylate polymer, and d) a polyacrylate copolymer, iii) a softener, iv) an inorganic phosphorus containing flame retardant, and vi) an organically modified clay, said clay modified with a quaternary ammonium compound,
the styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block is derived from monomer units of one or more of an olefin monomer and a diene monomer, wherein the at least one hard polymer block ranges from about 10 percent to 40 percent by weight based on the total weight of the styrenic block copolymer,
wherein when the a) polyolefin polymer or b) polyolefin copolymer or both the a) polyolefin polymer and the b) polyolefin copolymer are present the amount ranges from about 3 to about 60 parts based on 100 parts by weight of the styrenic block copolymer, and wherein when the c) polyacrylate polymer or d) polyacrylate copolymer or both the c) polyacrylate polymer and the d) polyacrylate copolymer are present the amount ranges from about 1 to about 100 parts based on 100 parts by weight of the styrenic block copolymer; and
when the composition has a Shore A hardness of about 40 to about 90.

30. The thermoplastic elastomer composition according to claim 29, wherein the softener is present in an amount from about 5 to about 100 parts by weight of the styrenic block copolymer, wherein the inorganic phosphorus-containing flame retardant is present in an amount from about 5 to about 70 parts based on 100 parts by weight of the styrenic block copolymer; a) polyolefin polymer, b) polymer copolymer, c) polyacrylate polymer or d) polyacrylate copolymer or any combination of said a) a polyolefin polymer, b) a polyolefin copolymer, c) a polyacrylate polymer, and d) a polyacrylate copolymer present; and softener; and wherein the organically modified clay is present in an amount from about 0.5 to about 30 parts per 100 parts by weight of the styrenic block copolymer.

31. The thermoplastic elastomer composition according to claim 29, wherein the a) polyolefin polymer or the b) polyolefin copolymer or both the a) polyolefin polymer and the b) polyolefin copolymer are present, and wherein the composition includes one or more of a metal oxide and a zinc-based compound in a total amount of 2 to about 20 parts per 100 parts by weight of the inorganic phosphorus-containing flame retardant.

32. The thermoplastic elastomer composition according to claim 29, wherein the c) polyacrylate polymer or the d) polyacrylate copolymer or both the c) polyacrylate polymer and the d) polyacrylate copolymer are present, and wherein the inorganic phosphorus-containing flame retardant is present in an amount from about 10 to about 70 parts per 100 parts by weight of the styrenic block copolymer; the a) polyolefin polymer, b) polyolefin copolymer, c) polyacrylate polymer or d) polyacrylate copolymer or any combination of said a), b), c), and d) present; and softener.

33. The thermoplastic elastomer composition according to claim 29, wherein the inorganic phosphorus-containing flame retardant has a surface coating thereon to reduce solubility upon exposure to water.

34. The thermoplastic elastomer composition according to claim 31, wherein the polyolefin polymer or the polyolefin copolymer comprises a functionalized polyolefin polymer or copolymer.

35. A soft, flame retardant thermoplastic elastomer composition, comprising:
i) a first styrenic block copolymer, ii) one or more of a) a polyolefin polymer, b) a polyolefin copolymer, the polyolefin copolymer derived from polymerization of two or more different monomers c) a polyacrylate polymer, and d) a polyacrylate copolymer, iii) a softener, iv) a surface coated composition comprising a surface coated agent encapsulating an inorganic phosphorus-containing flame retardant and v) a second styrenic block copolymer;
the first styrenic block copolymer having a modulus of about 2.0 E+5 to about 7.0 E+6 Pa, wherein the styrenic block copolymer has at least one hard polymer block derived from at least two aromatic vinyl compound units, and has at least one soft polymer block, wherein the soft polymer block is derived from monomer units of one or more of an olefin monomer and a diene monomer, wherein the at least one hard polymer block ranges from about 10 percent to 40 percent by weight based on the total weight of the styrenic block copolymer,
a second styrenic block copolymer having a modulus greater than 7.0 E+6 Pa, wherein the second styrenic block copolymer has at least one hard polymer block derived from at least two aromatic vinyl compound units, and has at least one soft polymer block, wherein the soft polymer block includes at least one repeat unit derived from an olefin or a diene;
wherein when the a) polyolefin polymer or b) polyolefin copolymer or both the a) polyolefin polymer and the b) polyolefin copolymer are present the amount ranges from about 3 to about 60 parts based on 100 parts by weight of the styrenic block copolymer, and wherein when the c) polyacrylate polymer or d) polyacrylate copolymer or both the c) polyacrylate polymer and the d) polyacrylate copolymer are present the amount ranges from about 1 to about 100 parts based on 100 parts by weight of the styrenic block copolymer.

36. The thermoplastic elastomer composition according to claim 35, wherein the softener is present in amount from about 5 to about 100 parts based on 100 total parts by weight of the styrenic block copolymer, and wherein the surface coated composition is present in an amount from about 5 to about 70 parts based on 100 total parts by weight of the styrenic block copolymers; softener; and a) polyolefin polymer, b) polyolefin copolymer, c) polyacrylate polymer or d) polyacrylate copolymer, or any combination of said a) a polyolefin polymer, b) a polyolefin copolymer, c) a polyacrylate polymer, and d) a polyacrylate copolymer present.

37. The thermoplastic elastomer composition according to 36,
the a) polyolefin polymer or the b) polyolefin copolymer or both the a) polyolefin polymer and the b) a polyolefin copolymer are present, wherein the thermoplastic elastomer composition includes one or more of a metal oxide and a zinc-based compound in a total amount of about 2 to about 20 parts per 100 parts by weight of the inorganic phosphorus-containing flame retardant.

38. The thermoplastic elastomer composition according to 37,
wherein the thermoplastic elastomer composition further comprises a platelet filler comprising one or more of a nanoclay, an organically modified clay, talc and mica in an amount from about 0.5 to about 30 parts per 100 parts by weight of the styrenic block copolymers.

* * * * *